No. 735,278. Patented August 4, 1903.

UNITED STATES PATENT OFFICE.

ADOLF LUFT, OF LEMBERG, AUSTRIA-HUNGARY.

PROCESS OF PRODUCING PLASTIC COMPOUNDS.

SPECIFICATION forming part of Letters Patent No. 735,278, dated August 4, 1903.

Application filed September 20, 1902. Serial No. 124,132. (No specimens.)

*To all whom it may concern:*

Be it known that I, ADOLF LUFT, a subject of the Emperor of Austria-Hungary, residing at Lemberg, Austria-Hungary, have invented certain new and useful Improvements in Processes of Producing Plastic Compounds, of which the following is a specification.

This invention relates to a process for producing a plastic mass, and is based on the known fact that upon boiling phenols with aldehydes, and especially with formaldehyde, in the presence of acid—for example, such as sulfuric, hydrochloric, oxalic acid, and the like—a mass results which when fresh is viscous and very plastic, and such mass when treated as hereinafter described is rendered useful for numerous purposes in the arts.

As an embodiment of the process the following example is given: About equal parts of phenol and of a forty-per-cent. formaldehyde solution are mixed with forty to eighty per cent. of sulfuric acid of a strength of 16° to 17° Baumé and heated in a suitable vessel to nearly the boiling-point, the vapor arising being condensed and returned into the vessel. The reaction due to this heating is continued with a rising temperature and violent boiling until a white viscous mass is obtained which settles at the bottom of the vessel. This mass is then separated from the liquid in a suitable manner, well washed, and dried at a high temperature. While in a fresh condition and for some time after its production the mass is plastic, but when dried it ultimately becomes brittle. The mass is non-inflammable and is neither attacked by hot concentrated mineral acids nor alkalies, which circumstance makes it especially suitable for permanent vessels for preparing acids, alkalies, and like chemicals, except for its brittleness. I have found that the consistency of the mass is altered by additions of suitable substances. For instance, solutions of camphor, or rubber, or glycerin, or alcohol in their natural state, or other similar materials prevent the hardening of the mass, and the mass therefore remains more or less plastic if it is mixed with one or several of the said substances. Also mechanical operations are not without influence on the properties of the mass, for a harder and very elastic mass is obtained if the latter has been pressed in slightly-warmed devices.

In order to render the mass transparent, it is boiled while in a fresh viscous condition, after previous washing with water, in the presence of a substance which reacts on the acid—as, for example, an aqueous solution of alkali or alkaline carbonate. It is then allowed to settle, thoroughly washed, and dissolved in a suitable solvent, such as a mixture of formalin and glycerin. The solution is thickened by continuous boiling and thereafter poured into molds and dried at a temperature of about 50° centigrade. The formalin can be recovered by distillation. Instead of said mixture of formalin and glycerin acetone, alcohol, or the like may also be employed as solvents. These solutions can besides, as such or after addition of suitable dyestuffs, be used as lakes or as waterproof coatings for fabrics, leather, or the like. On removal of the solvent the mass remains transparent and more or less plastic. Its property of being able to be drawn into threads before hardening makes the mass suitable for producing carbon filaments for electric incandescent lamps.

The mass is a non-conductor, and may therefore be employed for insulating purposes with electrical conductors or the like, and by virtue of its non-inflammability it can be advantageously used as a substitute for celluloid. It can also be advantageously used as a substitute for bone for billiard-balls, buttons, handles, rosettes, and the like. By the addition of suitable dyes and filling-bodies imitation amber, tortoise-shell, meerschaum, resin, vulcanite, coral, and like imitations can be obtained from the mass. This mass can likewise be used as a substitute for linoleum.

Obviously the invention is not restricted to the particular substances and proportions given in the several examples, and, indeed, many variations can be made both with reference to the selection and to the proportions of the constituents of the mixture. Instead of phenol homologues substitution products can be used, and instead of formaldehyde its polymers, isomers, and homologues, and instead of sulfuric acid other acids may be used.

What I claim, and desire to secure by Letters Patent of the United States, is—

1. The herein-described process of producing a plastic mass for use in the arts, consisting in mixing phenols and their homologues with aldehydes, acid and camphor, boiling the mixture, and finally washing and drying the resulting mass, substantially as described.

2. The process of producing a plastic mass for use in the arts, consisting in mixing phenols and their homologues with aldehydes, and an acid; boiling the mixture to obtain a precipitated mass, dissolving the mass thus obtained in suitable quantities of glycerin and formaldehyde, thickening the solution by boiling it, and finally drying the product, substantially as described.

3. The process of producing a plastic mass for use in the arts, consisting in mixing carbolic acid with formaldehyde and sulfuric acid, boiling the mixture, until a mass is obtained, separating the mass thus obtained from the liquid, treating the mass with alkalies, dissolving the same in a mixture of glycerin and formaldehyde, suitably thickening the solution by boiling and finally drying the product, substantially as described.

4. The process of producing a plastic mass for use in the arts, consisting in mixing carbolic acid with formaldehyde, sulfuric acid and camphor, boiling the mixture until a mass is obtained, separating the precipitated mass thus obtained from the liquid, treating such mass with alkalies, dissolving the mass in suitable solvents, thickening the solution by boiling, and finally molding and drying the product, substantially as described.

5. The process of producing a plastic mass for use in the arts, consisting in mixing carbolic acid with formaldehyde and sulfuric acid, boiling the mixtures to obtain a precipitated mass, mixing the mass thus obtained with suitable quantities of camphor, treating the mass with alkalies, dissolving the same in suitable solvents, and thickening the solution by boiling, substantially as described.

6. The herein-described process of producing a plastic mass for use in the arts, consisting in mixing carbolic acid with formaldehyde, sulfuric acid and camphor, boiling the mixture until a viscous mass is formed therein, separating the mass thus obtained from the liquid, and washing and molding the same, substantially as described.

7. The process of producing a plastic mass for use in the arts, consisting in mixing carbolic acid with formaldehyde and sulfuric acid, boiling the mixture until a mass is formed therein, separating the mass from the liquid, mixing it with suitable quantities of camphor, and molding the mass thus obtained, substantially as described.

8. The process of producing a plastic mass for use in the arts, consisting in mixing carbolic acid with formaldehyde and sulfuric acid, boiling the mixture to obtain a precipitated mass, separating the mass from the liquid, treating the mass with alkalies, dissolving the same in a mixture of glycerin and formaldehyde, thickening the solution by boiling, and finally molding the thickened mass, substantially as described.

9. The herein-described process of producing a plastic mass for use in the arts, consisting in mixing carbolic acid with formaldehyde, sulfuric acid and camphor, boiling the mixture to obtain a precipitated mass, separating the mass from the liquid, treating the mass with alkalies, then dissolving the same in suitable solvents, thickening the resultant solution by boiling, and finally molding the product substantially as described.

10. The herein-described process of producing a plastic mass for use in the arts, consisting in mixing carbolic acid with formaldehyde and sulfuric acid, boiling the mixture to obtain a precipitated mass, separating the mass from the liquid and mixing it with suitable quantities of camphor, treating the mass thus obtained with alkalies, dissolving the same in a mixture of glycerin and formaldehyde, suitably thickening the resultant solution by boiling, and finally molding and drying the thickened mass, substantially as described.

In testimony whereof I have hereunto set my hand in the presence of two witnesses.

ADOLF LUFT.

Witnesses:
HENRY HASPER,
WOLDEMAR HAUPT.